United States Patent [19]

Corral

[11] Patent Number: 4,769,891

[45] Date of Patent: Sep. 13, 1988

[54] HAND TOOL FOR TUBE FITTINGS

[76] Inventor: Pedro L. Corral, 1108 W. 70th Pl., Hialeah, Fla. 33014

[21] Appl. No.: 46,706

[22] Filed: May 7, 1987

[51] Int. Cl.[4] .................... B23P 19/04

[52] U.S. Cl. .................... 29/268; 81/419

[58] Field of Search .................... 29/234, 237, 268, 272; 81/418, 419, 426.5, 427.5

[56] References Cited

U.S. PATENT DOCUMENTS

| | | | |
|---|---|---|---|
| 1,085,461 | 1/1914 | Michaelis | 81/419 |
| 1,346,306 | 7/1920 | Duket | 29/246 |
| 1,929,497 | 10/1933 | Kelmer | 29/268 |
| 3,212,317 | 10/1965 | Lynch, Jr. | 81/423 |

FOREIGN PATENT DOCUMENTS

| | | | |
|---|---|---|---|
| 0973973 | 2/1951 | France | 81/427.5 |

*Primary Examiner*—Frederick R. Schmidt

*Assistant Examiner*—Judy J. Hartman

*Attorney, Agent, or Firm*—John Cyril Malloy

[57] ABSTRACT

A hand operable tool designed for use in connecting tube ends to couplers and like elements commonly used in lawn irrigation equipment. The tool comprises a head portion disposable between an open and closed position by the manipulation of handles wherein the distal ends of two arms of the head portion are bifurcated so as to effectively surround and retain ends of tubes so as to force, through clamping such tubes into attachment with an interconnecting coupling member, tee member, etc. The second gripping portion on the gripping head is designed to clamp between the arm the coupler, tee member, etc., to cause removal thereof from one or both of the tube ends wherein use of the tool greatly facilitates the reduction of effort and time in the assembly or disassembly of tubes and tube fittings in lawn irrigation equipment.

9 Claims, 1 Drawing Sheet

HAND TOOL FOR TUBE FITTINGS

BACKGROUND OF THE INVENTION

1. Field of the Invention

A hand operable tool having a "supplier" like operation characterized by two handles movable between an open and closed position to concurrently open and close respectively two arms of a head portion for the clamping together of two ends about and in attachment with a tube coupler element thereby reducing the inefficiency of accomplishing assembly and disassembly of such tube fittings and coupler elements by hand or through the use of non-specialized tooling.

2. Description of the Prior Art

Hand tools which may broadly be referred to as crimping tools are of course widely known in the prior art and have been in use in industries for many years. The development of such tools has reached a point where specialized tooling for a variety of specific purposes is quite common. Accordingly, while many of the generally referred to crimping tools operate similar to conventional pliers in that they incorporate spaced apart handles pivotally interconnected to open and close arms of a gripping head, the structural configuration and components associated with the "specialized" tools of modern day society differ effectively from commonly known pliers.

The following U.S. patents are representative of various types of hand tools of the type referred to above which are modified structurally to accomplish a specific performance in a manner which is generally more efficient than if conventional pliers or like non-specialized tools were utilized. Such patents include U.S. Pat. Nos. 3,212,317; 1,346,306; 1,085,461; and 970,500.

One area of commerce in need of a specialized tool is equipment and facilities relating directly to lawn irrigation and use with sprinkler systems wherein such sprinkler systems include flexible material conduit or tubing interconnected at correspondingly positioned ends to one another through metal or plastic material tee couplers or like elements and further wherein such tubing is used to interconnect component parts of pressure regulated electric and/or hydraulic valve parts.

Normally, such tubing incorporates retainer elements affixed to a free end of each tubing. The retainer element is an annular member overlying the free end but allowing access to the interior of the tube or conduit through the free end. The retainer serves to clamp the free end of the tube between it and a nozzle of the coupler. The aforementioned metal or plastic material coupler includes outwardly projecting nozzles designed to fit securely within the free end of the tubing through the retainer. The fit between the free end of the tubing and the coupler elements are maintained by friction. However they are sufficiently secured to render interconnection of the free ends of tubing and the coupler element, as well as removable therefrom, extremely difficult when attempting such assembly or disassembly by hand or when utilizing non-specialized tooling. This difficulty in turn lead to extensive time taken up in the assembly and disassembly of such tube fittings and therefore of course adds to the overall cost of installation of such irrigation systems.

There is therefore a need in the lawn irrigation industry for a specialized tool capable of increasing the efficiency of attaching tube fittings, of the type set forth above, to one another in a minimal amount of time and through the exertion of a minimal amount of effort.

SUMMARY OF THE INVENTION

The present invention relates to a specialized, hand operable or manipulatable tool which may generally be referred to as a crimping tool but which is specifically designed for the assembly and disassembly of tube fittings including end-to-end interconnection of tubing of the type used in the lawn irrigation industry for the attachment and/or interconnection of pressure regulated valve parts and like components. The tool of the present invention comprises a handle means including a first and second handle generally of an elongated configuration and pivotally interconnected to one another at a proximal end thereof so as to be selectively positionable between an open and a closed position. For purposes of clarity a closed position may be generally defined by the handles disposed in parallel side-by-side disposition relative to one another. The aforementioned open position may be defined by such handles as being disposed in spaced apart relation to one another. It should of course be emphasized that the term "parallel" when referring to the orientation of the handles is appropriate specifically to the embodiment to be described in greater detail hereinafter wherein such handles have a straight line, elongated configuration. The actual configuration of the handles may of course vary from the aforementioned straight line configuration without departing from the scope of the present invention.

The two handles, in addition to being pivotally interconnected to one another are also pivotally interconnected to two arms defining a gripping head portion of the tool. The two arms in addition to being pivotally attached to respective ones of the handle are pivotally interconnected to one another in a manner which defines a mechanical linkage allowing concurrent disposition of both the handles and the head portion in an open position and in a closed position concurrently. As will be apparent through further more detailed description of the structural features of this subject hand tool, the handles and arms of the gripping head are moved to an open position to allow operative engagement with tube ends and more specifically retainers on such tube ends. Attempted forcing of the arms of the gripping head portion towards a closed position through "squeezing" the handles towards one another into the aforementioned closed position will cause sufficient force to be exerted on the tube ends or tube fittings gripped by the distal ends of the arms of the gripping head portion, to cause a specific and quick interconnection of the free ends of the tube onto the coupler or alternately of one free end of the tube onto a coupler.

The gripping head portion of the tool further includes a second gripping portion including two gripping elements disposed along inner longitudinal sides of each arm and extending inwardly towards one another wherein the free end of each gripping element terminates in a textured or roughened mating surface. These mating surfaces serve to grip therebetween a coupler element or like component so as to facilitate pulling or removal of the free end of the tube therefrom by hand or by other specialized pliers, gripping tools, etc.

Specific structural features enabling the subject hand tool to specifically facilitate the assembly and disassembly of tubes and tube fittings of the type set forth herein include the distal ends of the arms of the gripping head being bifurcated so as to pass on opposite sides and essentially surround the tube end. Further, a retaining space is formed along the inner longitudinal side of each gripping arm between the distal end thereof and the aforementioned gripping element. Each of these retaining spaces are disposed in aligned relation to one another and are dimensioned to receive and substantially retain the end caps surrounding the free ends of the tubing therein. Other structural features incorporated in the hand tool is a bifurcated construction of a proximal end of one of the handles and one of the gripping arms thereby facilitating pivot interconnection thereof with the other handle and other gripping arm at spaced apart locations.

The invention accordingly comprises the features of construction, a combination of elements and an arrangement of parts which will be exemplified in the construction hereinafter set forth, and the scope of the invention wil be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
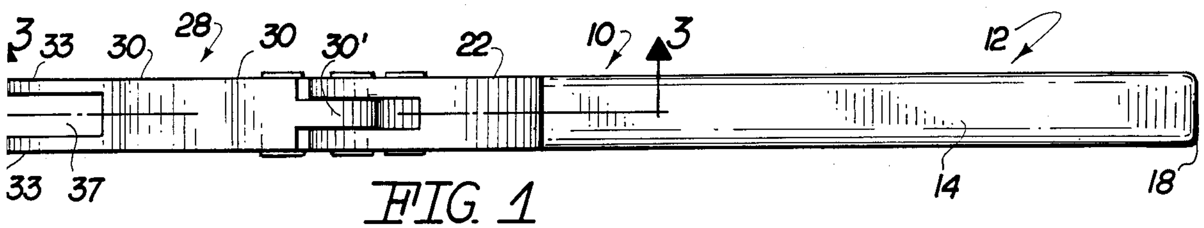
FIG. 1 is a side view of the hand tool of the present invention.
Figure 2:
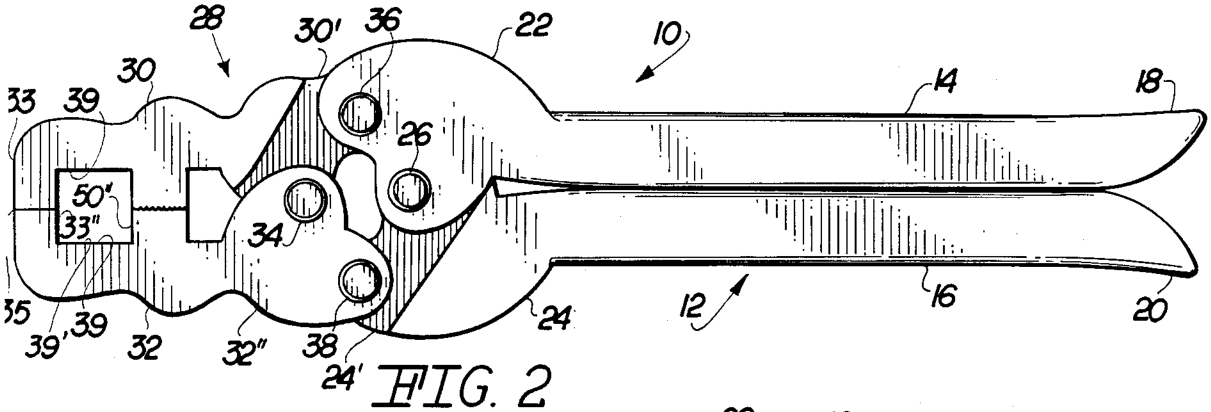
FIG. 2 is a front plan view of the embodiment of FIG. 1.
Figure 3:
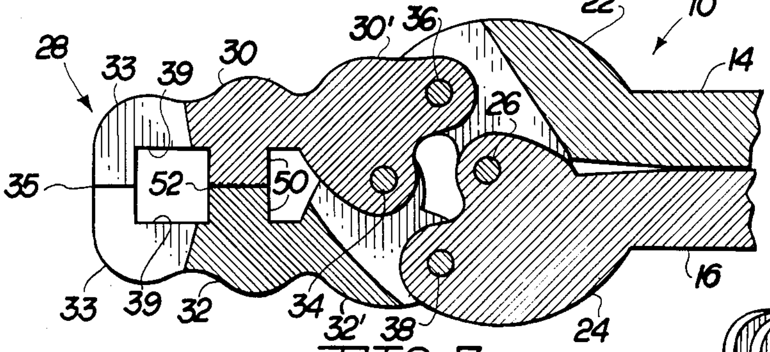
FIG. 3 is a sectional view in partial cut-away along line 3—3 of FIG. 1.

As shown in FIGS. 1 through 5 the hand tool of the present invention is generally indicated as 10 and comprises a handle means 12 including a first handle 14 and a second handle 16 each having a substantially elongated configuration and, in the embodiments shown in FIGS. 1 and 2 a straight line orientation each terminating in a free distal end 18 and 20 and respective proximal ends 22 and 24. The proximal ends 22 and 24 are pivotally interconnected to one another by a rivet or like connector element 26 so as to allow pivotal movement of the first and second handle 14 and 16 towards and away from one another. The position shown in FIGS. 1, 2 and 3 represent a closed position in that the handles 14 and 16 are disposed in substantially adjacent and parallel relation to one another based on their linear orientation. The handles 14 and 16 may of course be moved to an open position shown at least partially in FIG. 4 such that the handles are specifically spaced apart from one another. It should be evident that movement of the handles 14 and 16 between the open and closed position in turn serves to operate or position a gripping head generally indicated as 28 between an open and closed position respectively.

Figure 4:
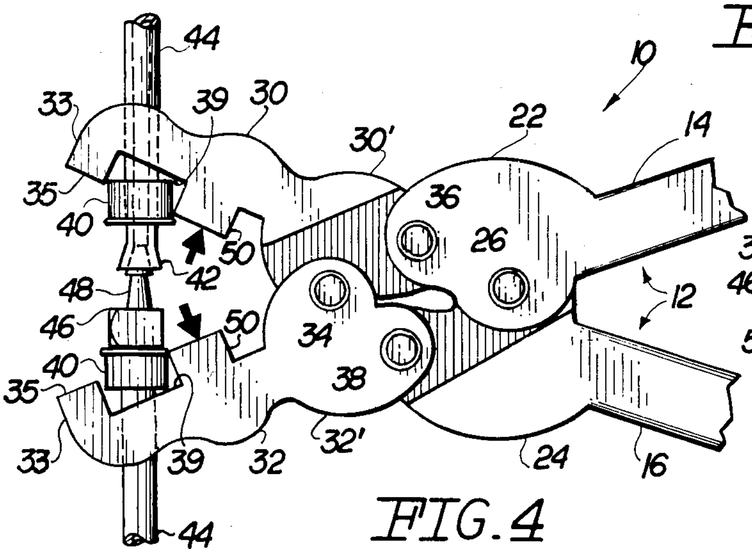
FIG. 4 is a detailed view in partial cut-away of the gripping head portion of the subject hand tool disposed into its opened position for operative positioning about tube ends and tube fittings to be interconnected.
Figure 5:
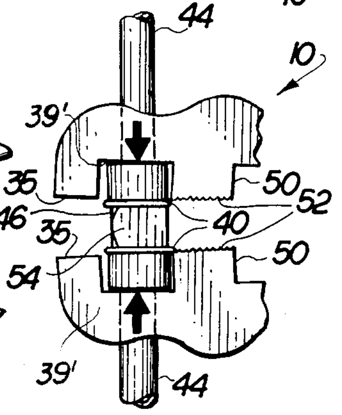
FIG. 5 is a detail view in partial cut-away of the gripping head being forced into the aforementioned closed position wherein force is exerted on the tube fittings causing interconnection of the tube ends to a coupler element.

The gripping head 28 comprises a first gripping arm 30 and a second gripping arm 32 each pivotally interconnected to one another by a rivet or like connector 34 and each being interconnected to one of the first and second handles 14 and 16 by similar rivet type or like connectors 36 and 38 respectively. Accordingly, from a review of FIGS. 2 and 3 it is clear that the first handle 14 is pivotally connected both to the second handle 16 and to the first arm 30. The second handle 16 is pivotally connected both to the first handle 14 and the second arm 32. In order to facilitate such interconnection and also improve the workings of the "linkage" defined by the aforementioned pivotal interconnections between the handle means 12 and the gripping head 28, both the proximal end 22 of the first handle 14 and the proximal end 32' of the second arm 32 are bifurcated so as to receive the correspondingly positioned proximal ends 24 as at 24' of the second handle 16 and proximal end 30' of the first arm 30 within the aforementioned bifurcated constructions of the proximal ends 22 and 32'. Further, the pivotal connection between these elements are disposed in spaced apart relation to one another as clearly shown in FIGS. 2 and 3 to facilitate opening and closing and proper gripping orientation of the arms 30 and 32 about the tube fittings and attachment of such tube fittings as shown in FIGS. 4 and 5.

With reference primarily to FIGS. 1 and 3, the distal ends of each of the gripping arms 30 and 32 also are defined by a bifurcated construction wherein each distal end comprises two spaced apart fingers 33. The two fingers 33 of each distal end of each gripping arm 30 and 32 extend inwardly from an inner longitudinal side of each gripping arm towards one another so as to mate or come into engagement at mating surfaces 35. Further, the space 37 (see FIG. 1) between the fingers 33 of each gripping arm 30 or 32 is sufficient to allow the tubes being connected as at 44 (see FIG. 4) to pass therebetween such that a retaining space 39 may be disposed in surrounding and retaining relation to retainers 40 fitting about the exterior of each tube end 42 of each tube 44 (see FIG. 4). As shown clearly in FIGS. 1 through 6, each of the retaining spaces 39 are more specifically defined by side portions 33' and 50' and base portion 39' being part of the respective first and second arms and interconnecting the fingers 33 and the gripping elements 50. As will be explained in greater detail hereinafter, the gripping elements 50 serve to define a second or coupler gripping portion of the gripping head 28. As clearly shown in FIGS. 4 and 5, the base portion 39' of each retaining space 39 serves to effectively hold or grip the tube or coupler members 40 allowing the tubes 44 to be forced together in accordance with the directional arrows provided therewith. The ends of the tube, as shown, are thereby attached upon the exertion of proper clamping force (see FIG. 5) to a coupler element 46. Such attachment is secured by the outwardly extending nozzles 48 of the coupler 46 extending into the interior of the free ends 42 of each of the tubes 44. The retaining spaces 39 are dimensioned both in length and depth to substantially correspond to and specifically receive the retainers 40 therein so that such retainers can effectively be "captured" for clamped engagement as shown in FIG. 5.

Figure 6:
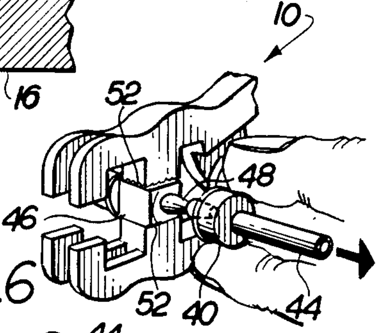
FIG. 6 is a perspective view in partial cutaway of the gripping head portion of the subject hand tool.

A second or coupler gripping portion of the gripping head 28 is defined by the inwardly extending gripping elements 50 having their inner ends secured to the inner longitudinal sides of each of the arms 30 and 32 and their outer ends terminating in a mating surface 52 which is textured or roughened such as being knurled to facilitate gripping of the exterior and preferably flat surface 54 of the coupler or like tube fittings as shown in FIG. 6. The coupler 54 is so gripped between the roughened mating surfaces 52 to provide proper fixed clamping thereof as one or both of the tubes 44 are pulled free from its interconnection and thereby disassembled. As is shown clearly in FIGS. 2 through 5 the ends of the retaining space 39 are defined by the parallel orientation of the gripping elements 50 and the fingers 33 located at the distal ends of each of the arms 30 and 32. Accordingly, the mating surfaces 35 and 52 are essentially disposed in a coplanar relation to one another when the head portion 28 is in the aforementioned closed position.

Now that the invention has been described, what is claimed is:

1. A hand tool for use in the assembly and disassembly of tube fittings of the type used in lawn irrigation equipment, said tool comprising:

a. a first handle and a second handle each having an elongated configuration and being movably connected to one another and selectively positionable between a closed position in which said handles are parallel, and an open position, b. a gripping head movably connected to said first and second handles and positionable between an open and a closed position, c. said gripping head comprising a tube gripping portion and a coupler gripping portion disposed in spaced relation to one another, d. said gripping head including a first arm and a second arm pivotally connected together and each pivotally connected to one only of said first and second handles, e. said tube gripping portion defined by cooperatively positioned distal ends of each of said first and second arms each including equally spaced-apart fingers extending inwardly towards one another to define a substantially bifurcated construction, said spaced-apart fingers of each distal end being equally dimensioned and configured and each axially disposable in surrounding and retaining relation to a separate tube end or coupler member being joined, f. said coupler gripping portion spaced inwardly from said distal ends and comprising two gripping elements each formed on one of said first and second arms, g. said gripping element of each of said first and second arms extending transversely outward from said respective arm to which they are attached and into mating engagement with one another when said gripping head is in said closed position, h. said gripping head further comprising a retaining space formed on an inner longitudinal side of each of said gripping arms and being defined by a space between corresponding ones of said fingers of each distal end, said gripping element and an interconnecting base portion between said respective fingers and said gripping element, i. end of said retaining spaces comprising three sides and having a sufficient depth and transverse dimension to substantially surround and retain a tube end and coupler member being joined, and j. said first and second handles and said gripping head concurrently positionable in said open positions and said closed positions respectively.

2. A tool as in claim 1 wherein said distal ends and said gripping elements each comprise mating surfaces disposed into respective mating engagement and in coplanar relation to one another when in said respective mating engagement.

3. A tool as in claim 2 wherein said mating surfaces of said gripping elements are each roughened to facilitate gripping of a coupler therebetween.

4. A tool as in claim 1 wherein said first handle comprise a bifurcated construction proximal end pivotally connected to correspondingly positioned proximal ends of both said second handle and said first arm at spaced locations from one another.

5. A tool as in claim 4 wherein said proximal ends of said first arm and said second handle are secured within said bifurcated construction of said first handle.

6. A tool as in claim 4 wherein said second arm comprises a bifurcated construction proximal end pivotally connected to correspondingly positioned proximal ends of both said second handle and said first arm at spaced locations from one another.

7. A tool as in claim 6 wherein said proximal ends of said first arm and said second handle are secured within said bifurcated construction of said second arm.

8. A tool as in claim 6 wherein said first and second handles comprise free distal ends.

9. A tool as in claim 1 wherein said distal end and said gripping elements of each of said first and second arms are disposed in parallel relation to one another and define the end boundaries of said retaining space.

* * * * *